(12) United States Patent
Ong et al.

(10) Patent No.: US 8,577,509 B2
(45) Date of Patent: Nov. 5, 2013

(54) METHOD AND A SYSTEM FOR CONTROLLING OPERATION OF A WIND TURBINE

(75) Inventors: Jiun Keat Ong, Singapore (SG); Tie Ling Zhang, Singapore (SG); Yu Zhou, Singapore (SG); Khoon Peng Lim, Singapore (SG); Wan Ying Chen, Singapore (SG); Pey Yen Siew, Singapore (SG); Kiran Kishan Rao Nandedkar, Singapore (SG); Jiann Yi Ho, Singapore (SG); Bung Chai Chin, Singapore (SG)

(73) Assignee: Vestas Wind Systems A/S, Aarhus N (DK)

( * ) Notice: Subject to any disclaimer, the term of this patent is extended or adjusted under 35 U.S.C. 154(b) by 369 days.

(21) Appl. No.: 12/820,194

(22) Filed: Jun. 22, 2010

(65) Prior Publication Data

US 2010/0332272 A1  Dec. 30, 2010

Related U.S. Application Data

(60) Provisional application No. 61/220,224, filed on Jun. 25, 2009.

(30) Foreign Application Priority Data

Jun. 24, 2009 (DK) .................................. 2009 00784

(51) Int. Cl.
*G05D 3/12* (2006.01)
*F03D 9/00* (2006.01)
*G06F 17/40* (2006.01)
*B63H 1/00* (2006.01)
*B64C 11/00* (2006.01)

(52) U.S. Cl.
USPC ............. 700/287; 700/289; 290/44; 702/187; 416/1; 416/61

(58) Field of Classification Search
USPC ......... 700/287, 289; 290/44; 702/187; 416/1, 416/61
See application file for complete search history.

(56) References Cited

U.S. PATENT DOCUMENTS

RE37,073 E * 2/2001 Hammond ................... 379/67.1
6,442,511 B1 * 8/2002 Sarangapani et al. ........ 702/194
(Continued)

FOREIGN PATENT DOCUMENTS

DE 19713583 A1 10/1998
EP 1674724 A2 6/2006
(Continued)

OTHER PUBLICATIONS

Hammerum et al. A fatigue approach to wind turbine control, 2007.*
(Continued)

*Primary Examiner* — Kavita Padmanabhan
*Assistant Examiner* — Darrin Dunn
(74) *Attorney, Agent, or Firm* — Patterson & Sheridan, LLP

(57) ABSTRACT

A method and a system for controlling operation of a wind turbine are provided. The method includes determining at least one failure mode relating to one or more components of the wind turbine, estimating a remaining lifetime of the component under current operating conditions, determining one or more control schemes to control the operation of the wind turbine in order to adjust the remaining lifetime of the component to a desired remaining lifetime of the component, determining a power production yield for the determined one or more control schemes and selecting a determined control scheme for controlling the operation of the wind turbine that maximizes the power production yield.

20 Claims, 8 Drawing Sheets

(56) References Cited

U.S. PATENT DOCUMENTS

| | | | |
|---|---|---|---|
| 6,490,543 B1 | 12/2002 | Jaw | |
| 7,203,554 B2 * | 4/2007 | Fuller | 700/28 |
| 7,222,048 B2 * | 5/2007 | Petchenev et al. | 702/182 |
| 7,254,514 B2 * | 8/2007 | House et al. | 702/181 |
| 7,322,794 B2 * | 1/2008 | LeMieux et al. | 416/40 |
| 7,523,001 B2 * | 4/2009 | Morjaria et al. | 702/3 |
| 7,676,285 B2 * | 3/2010 | Hoyte et al. | 700/52 |
| 7,805,205 B2 * | 9/2010 | Santos | 700/28 |
| 2003/0004659 A1 * | 1/2003 | Hayashi et al. | 702/60 |
| 2004/0057828 A1 | 3/2004 | Bosche | |
| 2004/0230377 A1 | 11/2004 | Ghosh et al. | |
| 2005/0209713 A1 * | 9/2005 | Fuller | 700/29 |
| 2006/0056959 A1 * | 3/2006 | Sabol et al. | 415/118 |
| 2007/0140847 A1 * | 6/2007 | Martinez de Lizarduy Romo et al. | 416/11 |
| 2008/0135235 A1 * | 6/2008 | McCalvin | 166/250.01 |
| 2008/0206052 A1 | 8/2008 | Volkmer | |
| 2008/0208487 A1 * | 8/2008 | Goebel et al. | 702/34 |
| 2009/0153656 A1 * | 6/2009 | Sharonova | 348/125 |
| 2009/0249128 A1 * | 10/2009 | Heckman et al. | 714/47 |
| 2009/0281735 A1 * | 11/2009 | Bechhoefer | 702/34 |
| 2009/0282840 A1 * | 11/2009 | Chen et al. | 62/50.3 |
| 2009/0312956 A1 * | 12/2009 | Zombo et al. | 702/34 |
| 2010/0268395 A1 * | 10/2010 | Ingemann et al. | 700/289 |

FOREIGN PATENT DOCUMENTS

| | | |
|---|---|---|
| EP | 1911968 A1 | 4/2008 |
| EP | 1930855 A2 | 6/2008 |
| JP | 2006241981 A | 9/2006 |

OTHER PUBLICATIONS

Danish Patent and Trademark Ofice, Office Action and Search report issued in related Denmark patent application No. PA 2009 00784 dated Feb. 1, 2010.

McMillan et al, "Toward Quantification of Condition Monitoring Benefit for Wind Turbine Generators", Renewable Power Generation, IET, Mar. 2008, vol. 2 Issue: 1, 11 pages.

Giebhardt, et al, "Requirements for Condition Based Operation and Maintenance in Offshore Wind Farms", Presentation at the European Offshore Wind Conference and Exhibition, Berlin, Germany, Dec. 4-6, 2007, 7 pages.

Hammerum, K. et al. "A fatigue approach to wind turbine control", Journal of Physics: conference series, institute of physics publishing, Bristol, GB vol. 75. No. 1, Jul. 1, 2007.

Sorensen et al., "Fundamentals for Remote Structural Health Monitoring of Wind Turbine Blades a Preproject", Internet citation May 1, 2002, p. 40.

European Patent Office, Search Report issued in related European application No. EP 10 16 6804 dated Nov. 2, 2011.

* cited by examiner

METHOD AND A SYSTEM FOR CONTROLLING OPERATION OF A WIND TURBINE

CROSS-REFERENCE TO RELATED APPLICATIONS

The present application claims the benefit of U.S. Provisional Application No. 61/220,224, filed Jun. 25, 2009, and claims priority under 35 U.S.C. §119 to Danish Patent Application 2009-00784, filed Jun. 24, 2009. The content of each of these applications is hereby incorporated by reference herein in its entirety for all purposes.

FIELD OF THE INVENTION

The present invention relates to a method for controlling the operation of a wind turbine, and to a system for performing the method. More particularly, the present invention relates to a method to determine a control scheme for extending the remaining lifetime of the wind turbine.

BACKGROUND OF THE INVENTION

When controlling the operation of a wind turbine, a number of parameters relating to the wind turbine are normally measured. Some of these parameters may relate to the health of one or more components of the wind turbine, such as a gear system, part of a gear system, a bearing, a generator, a drive shaft, etc. These parameters may include a temperature of the component or measured in the vicinity of the component, load, stress or strain of a component, etc. Measuring and analysing such parameters allows an operator to detect when a component reaches a state where it is expected to break down. When this happens, a service inspection must be scheduled in order to repair or replace the component. This results in undesired service events which are additional to the normal service schedule. Furthermore, in the case that the component breaks down before the service inspection can take place, the wind turbine must be stopped for a period of time. This has the consequence that the power production of the wind turbine is decreased.

"Towards Quantification of Condition Monitoring Benefit for Wind Turbine Generators", David McMillan et al., European Wind Energy Conference 2007, discloses a maintenance strategy for wind farms using different probabilistic models in order to improve operational efficiency of the wind farms. The condition of one or more turbine components, including the gear box and the generator, is monitored.

"Requirements for Condition Based Operation and Maintenance in Offshore Wind Farms", Jochen Giebhardt et al., European Wind Energy Conference 2007, describes fault detection for offshore wind turbines using online Condition Monitoring Systems.

BRIEF SUMMARY OF THE INVENTION

It is an object of the invention to provide a method and a system for controlling the operation of a wind turbine, wherein the number of unscheduled service inspections is reduced as compared to prior art methods.

It is a further object of the invention to provide a method and a system for controlling the operation of a wind turbine, wherein the total downtime of the wind turbine is reduced as compared to prior art methods.

According to a first aspect of the invention, a method for controlling the operation of a wind turbine is provided. The method comprises:

determining at least one failure mode relating to at least one component of the wind turbine;

estimating a remaining lifetime of the component under current operating conditions;

determining one or more control schemes to control the operation of the wind turbine in order to adjust the remaining lifetime of the component to a desired remaining lifetime;

determining a power production yield for the determined one or more control schemes; and Selecting a determined control scheme for controlling the operation of the wind turbine which optimises the power production yield.

In the present context the term 'wind turbine' is interpreted to mean a structure being adapted to extract energy from the wind and convert it into electrical energy. Modem wind turbines normally comprise a tower construction rotatably supporting a nacelle. The nacelle carries a hub having a set of rotor blades attached thereto. The rotor blades can be directed towards the wind by rotating the nacelle relative to the tower construction. The interior part of the nacelle contains energy converting equipment, e.g., a drive train including a gear arrangement and a generator, the generator being electrically connected to a power grid. As an alternative, the wind turbine may be of a gearless kind.

The method comprises the step of determining at least one failure mode relating to at least one component of the wind turbine. The component includes, but not limited to, gear arrangement, gear parts, including drive shafts or gear wheels, bearings or generator. Failure mode refers to the types of failures that may happen to the component in the wind turbine. For example, failure modes of gear box may include but not limited to smearing, spalling and indentations on bearings and their rolling elements. Other examples of gearing failure also include wearing of gear teeth surface, broken teeth, etc. There can be other types of failures such as cracks in the chassis and mounting (such as torque plate), shaft misalignment, ventilation and lubrication system, etc.

After the failure mode of the component is determined, a remaining lifetime of the component under the current operating conditions is estimated. In the present context the term 'remaining lifetime' is interpreted to mean the time which in average will lapse before the component breaks down, if the wind turbine is continuously operated under the current operating conditions, e.g., in terms of output power level.

Subsequently, a number of control schemes for controlling the operation of the wind turbine are determined in order to adjust the remaining lifetime of the component to a desired remaining lifetime. One of the control schemes may, e.g., include prolonging the remaining lifetime sufficiently to allow the wind turbine to continue operating until the next scheduled service event. Therefore, downtime as well as unscheduled service events is avoided. Alternatively or additionally, the remaining lifetime may be prolonged to reach a time period where it is more convenient to perform service or maintenance on the wind turbine. Such time periods may, e.g., include low wind periods or periods with improved weather conditions. This is particularly relevant for offshore wind turbines where favourable weather conditions are crucial for gaining access to the turbine. As another alternative, in the case that it is not possible to prolong the remaining lifetime to the next scheduled service event or to a more convenient time period, the control scheme may include scheduling an additional service event within the time span which the remaining lifetime can be prolonged to. Thus, the control schemes are different recommendations that maximise the total power output of the wind turbine in the period until the required service is performed. Also, the control schemes may include recommendations to extend the operational time of the wind turbines before a required service is performed.

For each of the different control schemes, a power production yield is determined. When the wind turbine is operated at reduced output power level, any income arising from the produced power is also reduced. This loss of income may be weighed against the expenses involved in performing an unscheduled or extra service event and/or in downtime of the wind turbine due to the component breaking down. Thus, the power production yield provides information relating to the income and cost involved in the different control schemes. This allows an informed decision on how to control the operation of the wind turbine to be made. Eventually, a control scheme is selected to control the operation of the wind turbine. This selection is made based on the power production yield information obtained earlier.

According to an embodiment, the determining of at least one failure mode comprises obtaining data relating to health status of one or more components of the wind turbine, analyzing the obtained data to determine whether there is any abnormality, triggering an alert signal when it is determined that there is abnormality in the obtained data, and determining at least one failure mode based on the analyzed data.

In the present context, the term 'health status' is interpreted to mean a status being indicative of whether or not and to what extent the component is operational. Thus, the health status for a component may indicate whether the component is likely to break down in the near future, and/or whether a malfunction and/or an error is likely to occur. The health status may also indicate whether the present operating settings are suitable for the component. Data relating to the health status of the component may include, but not limited to, the temperature of the component or in the vicinity of the component, vibrations of the component, stress of the component, strain of the component and/or loads of the component.

The obtained data are analyzed for any abnormalities. Examples of abnormalities include the temperature of a component exceeding a certain threshold, the strain, stress or vibration level of a component is too high, there is a significant change in signal amplitudes, etc. Alarm levels may be set for the various parameters to be measured. When any of these alarm levels are exceeded, it means that a particular abnormality has been detected, and an alert signal is triggered. When the alert signal is triggered, the failure mode relating to the component is determined.

It is possible that two or more sets of data are used to determine a particular failure, the two or more sets of data triggering two or more alert signals. It is only when the alert signals corresponding to these two sets of data are triggered, then a particular failure mode has been determined to have occurred. Thus, the detection of a failure mode in this manner yields a high confidence level and minimizes the probability of a false alarm.

According to an embodiment, analyzing the obtained data to determine whether there is any abnormality comprises determining whether there is any substantial deviation of the obtained data from a predetermined set of data. For example in a wind farm, the data of identical or similar components of some or all of the wind turbines in the wind farm are obtained. An abnormality in a component of one wind turbine is determined to exist if the data obtained from the component of the wind turbine is significantly different from an average value of the data obtained from the identical or similar components of the other wind turbines in the same wind farm.

According to an embodiment, the obtaining of the data relating to the health status for one or more components comprises measuring one or more parameters of each component by means of one or more sensors. According to this embodiment the data relating to health status for the component is obtained directly by measurements. Examples of suitable sensors include, but not limited to, temperature sensors, vibration sensors, strain sensors and stress sensors. As an alternative to measuring parameters, data relating to health status for one or more components may be obtained in an indirect manner.

The step of estimating a remaining lifetime of the component may be performed based on empirically obtained data. The empirically obtained data may comprise data relating to wind speed and/or wind direction at the site of the wind turbine. Such data may have been obtained during a period preceding the erection of the wind turbine, and/or during operation of the wind turbine. The empirically obtained wind data may be statistically processed. In particular, information regarding, e.g., wind speed distribution at the site of the wind turbine may be obtained in the form of average wind speed for each month, possibly supplemented by information regarding the standard deviation of the wind speed data. The wind speed may vary during the year, i.e. higher wind speeds may be likely to occur during the winter season than during the summer season. Statistically processed empirical data as described above may be used for estimating the expected wind speed at the site of the wind turbine within the next one or more months. This may be a factor when determining how to control the operation of the wind turbine in order to adjust the remaining lifetime to a desired remaining lifetime. For instance, during low wind periods it is more likely that it is possible to operate the wind turbine at maximum output power without the risk of a component breaking down, than it is during high wind periods.

Alternatively or additionally, the empirically obtained data may comprise data relating to lifetimes of components identical or similar to the component. Such data may, e.g., be obtained in the following manner. When a given alarm level is detected for a given component, that component is monitored and the power output as a function of time, as well as the time lapsing between the alarm level was detected until the component broke down is logged. This is done for a large number of identical or similar components, and thereby statistical information about remaining lifetime of the component under various operating conditions is obtained. This information may advantageously be used for estimating or calculating the remaining lifetime of the component when a given alarm level is detected, and under given operating conditions.

According to an embodiment, one control scheme comprises reducing the power production of the wind turbine in order to extend the remaining lifetime of the component to a coming scheduled maintenance of the wind turbine. This prevents breaking down of the component before the coming scheduled maintenance which may result in loss of power production, and hence income/profit, during the period from the time the component broke down and the scheduled maintenance. The breaking down of the component before the scheduled maintenance may also require an unscheduled maintenance to be made, resulting in extra cost.

According to an embodiment, the power production yield for each of the control schemes is determined based on at least one factor selected from a group consisting of wind forecast, power tariff, and cost of equipment.

The wind forecast allows the wind speed within the next one or more months to be estimated. This wind data forecast information can then be used to decide when it is suitable to conduct a maintenance service of the wind turbine. This information can be used to decide how to de-rate the wind turbine so that the remaining lifetime of the component can be extended into the scheduled maintenance. In particular, it can be used to determine how to operate the wind turbine at a maximum power output level until the next scheduled maintenance.

The power tariff is mainly used to estimate the income of electricity produced within the de-rating period. Therefore, the power production yield more accurately reflects and projects income information relating to the operation of the turbine, with de-rating and without de-rating. Meanwhile, the power tariff can also be used as a factor to consider the timing of de-rating. For example, when the tariff is high, de-rating the turbine may result in higher loss of income. Hence, it is better to locate a time period where the power tariff is low for de-rating the wind turbine. It should be noted that the power tariff is a more constant variable compared to wind speed for short time period.

The cost of equipment may also be taken into account. Maintaining a high output power level may cause complete breakdown of a component, while a reduced output power level may allow the component to survive until it can be repaired. For a component having a high cost of equipment, the cost of component breaking down is higher than a component with a low cost of equipment. Therefore for component with high cost of equipment, it is desirable to extend the lifetime of the component until it can be repaired, rather than replacing the component after a complete breakdown.

Hence, by taking one or more of such factors into account, the power production yield more accurately reflects the income information for the control scheme. This allows a more informed decision on the selection of the control schemes.

According to an embodiment, the method may further comprise generating a recommendation report comprising the control schemes and the respective power production yield. The recommendation report presents the information determined earlier in a useful manner so as to allow a person to easily understand and compare the different control schemes and their corresponding power production yield. The format of the recommendation report may be customizable. Accordingly, the person is able to easily select the control scheme which best suits his or her requirements.

According to an embodiment, the operation of the wind turbine is controlled using the selected control scheme.

According to a second aspect, the invention provides a system for controlling the operation of a wind turbine, the system comprising:

a failure mode analyzer adapted to determine a failure mode of at least one component of the wind turbine;

a lifetime calculator adapted to determine a remaining lifetime of the component under current operating conditions;

a control unit adapted to determine one or more control schemes to control the operation of the wind turbine in order to adjust the remaining lifetime of the component to a desired remaining lifetime; and a cost evaluator adapted to determine a power production yield for the one or more control schemes.

It should be noted that a person skilled in the art would readily recognise that any feature described in combination with the first aspect of the invention could also be combined with the second aspect of the invention, and vice versa. The system according to the second aspect of the invention may advantageously be adapted to perform the method of the first aspect of the invention.

According to an embodiment, the failure mode analyzer determines the failure mode based on data relating to health status of the component of the wind turbine, as mentioned in relation to the first aspect of the invention. The lifetime calculator may be adapted to calculate the remaining lifetime of the component in a manner described above with reference to the first aspect of the invention.

The one or more control schemes may include a recommendation to reduce the power production of the wind turbine in order to extend the remaining lifetime of the component to a coming scheduled maintenance of the wind turbine. The control schemes may be similar to those already described in relation to the first aspect of the invention.

The cost evaluator may determine the power production yield for the one or more control schemes based on at least one factor selected from a group consisting of power tariff, cost of equipment and wind data forecast. The advantage of using any of the factors for determining the power production yield has been described earlier in relation to the first aspect of the invention.

According to an embodiment, the system further comprises a report generator adapted to generate a recommendation report. The recommendation report includes the control schemes and their respective power production yield. As mentioned earlier, this allows a person to easily select the control scheme which best suits his or her requirements.

The invention further relates to a wind power plant comprising at least one wind turbine and a monitoring unit. The monitoring unit comprises:

A failure mode analyzer adapted to determine a failure mode for at least one component of the wind turbine;

a lifetime calculator adapted to determine a remaining lifetime of the component under current operating conditions;

a control unit adapted to determine one or more control schemes to control the operation of the wind turbine in order to adjust the remaining lifetime of the component to a desired remaining lifetime; and a cost evaluator adapted to determine a power production yield for the one or more control schemes.

According to an embodiment, the wind turbine comprises one or more sensors for obtaining data relating to the health status of the component of the wind turbine. The sensors are arranged at or in the vicinity of the component. As mentioned earlier with regard to the first aspect of the invention, the data relating to health status for the component is obtained directly by measurements from the sensors. Examples of suitable sensors include, but are not limited to, temperature sensors, vibration sensors, strain sensors and stress sensors.

According to an embodiment, the monitoring unit further comprises a report generator adapted to generate a recommendation report. The recommendation report includes the control schemes and their respective power production yield. As mentioned earlier with regard to the first and second aspect of the invention, this allows a person to easily select the control scheme which best suits his or her requirements.

BRIEF DESCRIPTION OF THE SEVERAL VIEWS OF THE DRAWINGS

The invention will now be described in further detail with reference to the accompanying drawings in which.

DETAILED DESCRIPTION OF THE INVENTION

Figure 1:
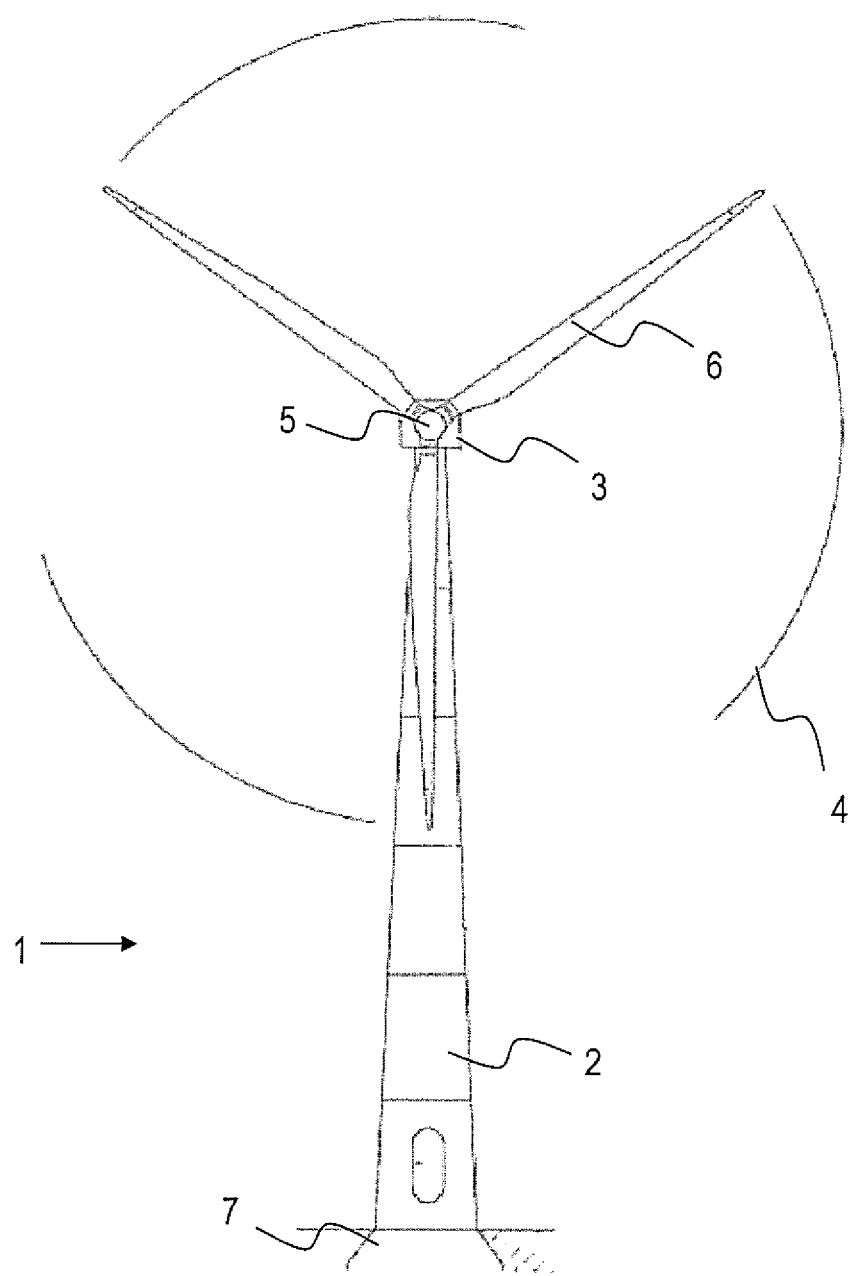
FIG. 1 illustrates a structure of a wind turbine.

FIG. 1 shows a general setup of a wind turbine 1. The wind turbine 1 includes a tower 2 having a number of tower sections, a nacelle 3 positioned on top of the tower 2, and a rotor 4 extending from the nacelle 3. The tower 2 is erected on a foundation 7 built in the ground. The rotor 4 is rotatable with respect to the nacelle 3, and includes a hub 5 and one or more blades 6.

Wind incident on the blades 6 causes the rotor 4 to rotate with respect to the nacelle 3. The mechanical energy from the rotation of the rotor 4 is converted into electrical energy by a generator (not shown) in the nacelle 3. The generated electrical energy can be supplied to an electrical grid or to a local community. Wind turbines are expected to be in operation for many years. Therefore, various monitoring systems are used to monitor the operating health of components of the wind turbines. Examples of such components include, but not limited to, gearbox, generator, yaw bearings, etc. This is done by having many sensors in the wind turbines to obtain data relating to physical characteristics of the components in the wind turbines, and processing these data to determine whether any of the components has a high possibility of breaking down. When a component is determined to have high possibility of breaking down, the component is replaced or some other corrective measures are taken.

Figure 2A:
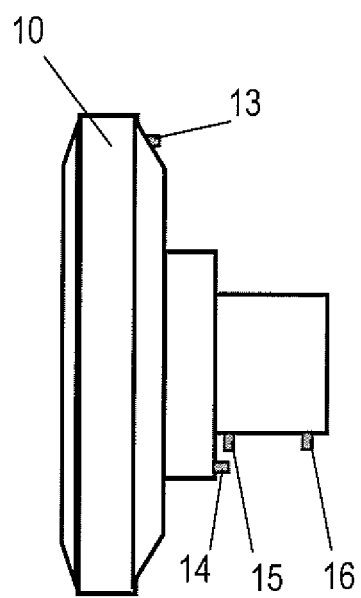
FIGS. 2a-2c illustrate sensors arranged on a gear box and a generator.
Figure 2B:
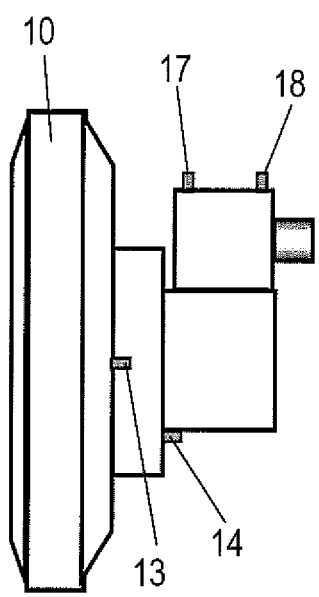
Figure 2C:
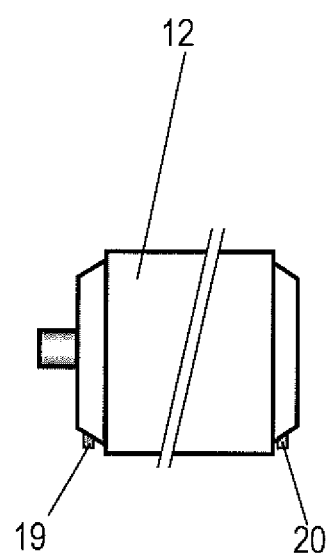

FIG. 2a shows a side view of a gear box 10 of a wind turbine. FIG. 2b shows a top view of the gear box 10 of FIG. 2a. FIG. 2c shows a side view of a generator 12 of the wind turbine 1. The gear box 10 and the generator 12 are provided with a total of eight accelerometers 13-20, arranged at various positions of the gear box 10 and the generator 12. The accelerometers 13-20 are used for detecting vibrations in the gear box 11 or in the generator 12, respectively, at their respective positions. The result of the measurements performed by the sensors 13-20 is analysed in a condition monitoring system (CMS), and based on the analysis a health state for the gear box 10 and a health state for the generator 12 are derived. Thus, if one or more of the sensors 13-18 arranged on the gear box 10 present an elevated vibration level, this is an indication that the gear box 10 is in a non-optimal health state. The CMS then triggers a corresponding alarm or alert signal for the gear box 10. Similarly, if one or both of the sensors 19, 20 arranged on the generator 12 measure an elevated vibration level, it is concluded that the generator 12 is in non-optimal health state, and a corresponding alarm or alert signal is triggered for the generator 12.

Different alarm levels may be set for different vibration levels at the gearbox 10 and/or generator 12. For example, 5 alarm levels may be set for the gearbox with alarm level 1 being the least severe and alarm 5 the most severe. If alarm level 1 is triggered, it means that the gearbox 10 starts to demonstrate some signs of failing, and may break down in the near future. If alarm level 5 is triggered, it means that the gearbox 10 is going to break down very soon and maintenance should be scheduled immediately to repair or replace the component. The vibration level corresponding to the different alarm levels may be defined based on statistical data from similar or identical components from other turbines, wind and site data, etc.

The gear box 10 and/or the generator 12 may alternatively or additionally be provided with other kinds of sensors, such as temperature sensors, which can be used for measuring a parameter being indicative of the health status of the component. Furthermore, the gear box 10 and/or the generator 12 may be provided with any number of sensors in alternative embodiments.

Figure 3:
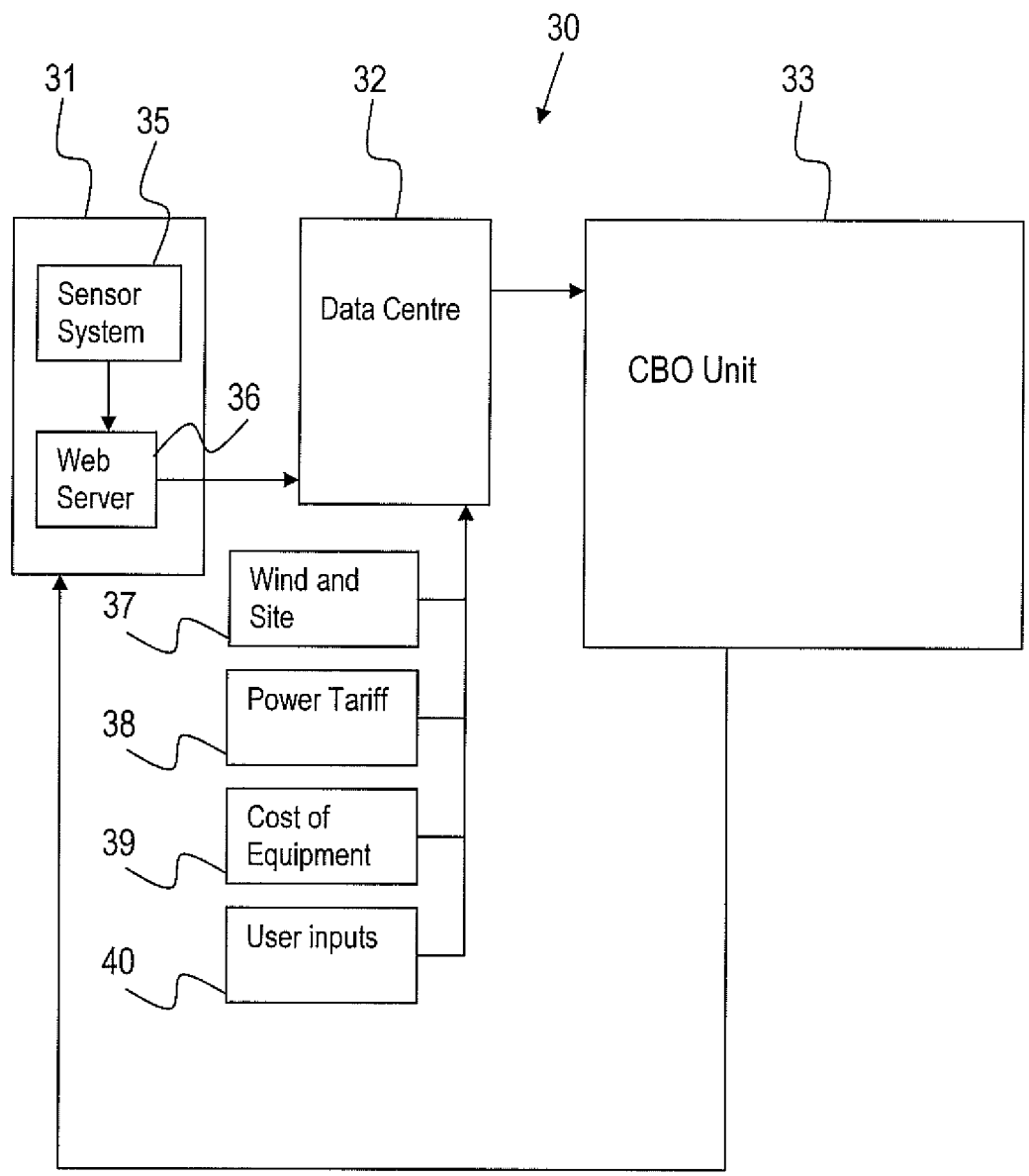
FIG. 3 illustrates a general layout of a CBO system for controlling the operation of a wind turbine according to an embodiment.

FIG. 3 illustrates a general layout of a Condition Based Operation (CBO) system 30 according to an embodiment. The system 30 includes a wind turbine 31, a data centre 32 and a CBO unit 33. The wind turbine 31 includes a sensor system 35 and a web server 36. The sensor system 35 includes sensors that are used for monitoring the physical characteristics of the components in the wind turbine 31. For example, the sensor system 35 may include the accelerometers 13-20 of FIG. 2a for monitoring the vibration level of the gearbox 10. Such vibration (or other physical characteristic) data obtained by the sensors relates to the health status of the components in the wind turbine 31. The data obtained from the sensor system 35 is sent to the web server 36 which is in turn sent to the data centre 32. The sending of the data from the sensor system 35 to the web server 36 and/or from the web server 36 to the data centre 32 may be done via Ethernet. Other means of sending the data, such as wireless means (WLAN), fiber optic cable, GPRS are also possible. It should be noted that the web server 36 is optional, and may not be present in the wind turbine 31. In this case, the data collected by the sensor system 35 may be sent directly to the data centre 32.

The data centre 32 is a central data processing centre which receives information from various sources and processes them. In an embodiment, the data centre 32 receives the data from the wind turbine 31. Additionally, the data centre 32 also receive other information including but not limited to wind and site data 37, power tariff 38 and cost of equipment 39. A user may also provide additional inputs such as information relating to the health status of the components, age of the components, weather information or any special desired control settings to be made to the turbine. Such user inputs 40 may be provided by the user using a computer terminal located at the data centre 32 or at a remote location connected by a data network such as the Internet or Ethernet.

The information received by the data centre 32 is sent to the CBO unit 33 which analyzes the information and provides de-rating control recommendations according to an embodiment of the invention. The output from the CBO unit 33 includes de-rating control recommendation(s). One of the recommendations may be selected for controlling the operation of the wind turbine 31. The recommendation may be selected manually by a user, or automatically by the CBO unit. In an embodiment, the output of the CBO unit 33 is a control signal (based on a selected de-rating recommendation) for controlling the operation of the wind turbine 31.

As shown in FIG. 3, the wind turbine 31, the data centre 32 and the CBO unit 33 are separate units from one another. This is only to illustrate the different functions performed by these units 31, 32, 33. In one embodiment, the data centre 32 and CBO unit 33 are located outside the wind turbine 31. It is also possible that the either the data centre 32 or the CBO unit 33, or both the data centre 32 and the CBO unit 33 are located inside the wind turbine 31.

Figure 4:
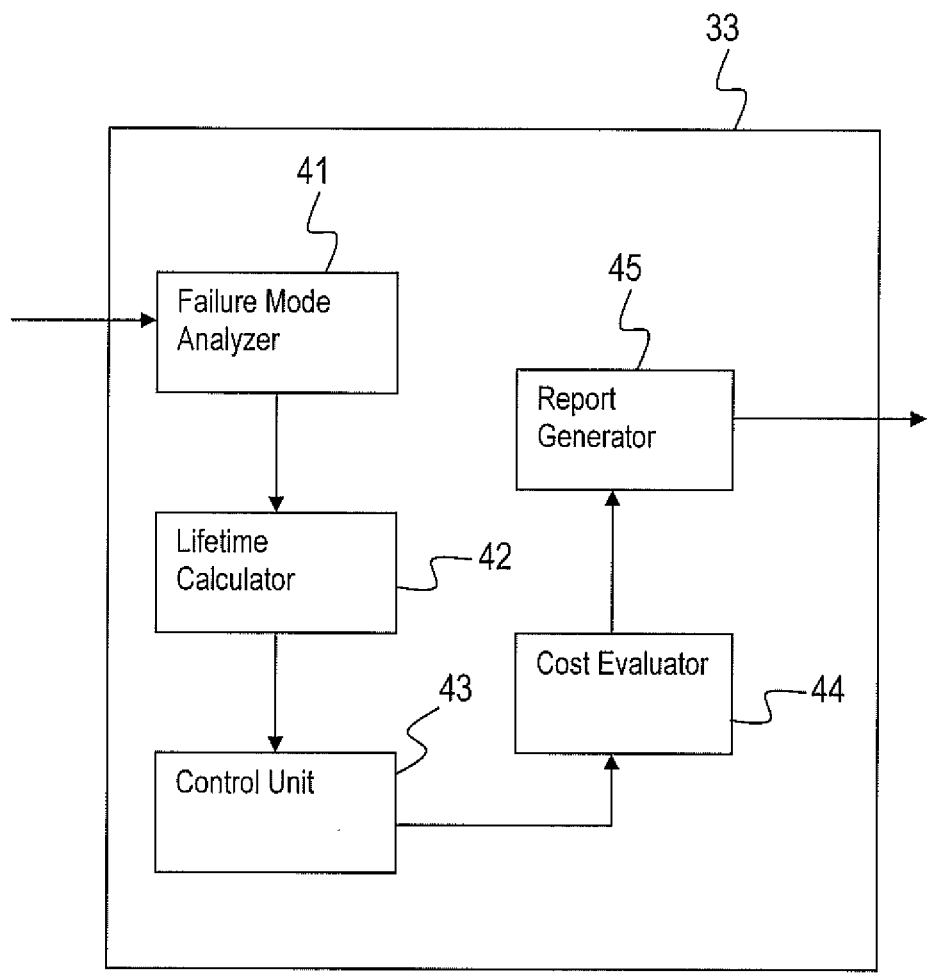
FIG. 4 illustrates a layout of a CBO unit according to an embodiment.

FIG. 4 illustrates a layout of the CBO unit 33 according to an embodiment. The CBO unit 33 includes a failure mode analyzer 41, a lifetime calculator 42, a control unit 43, a cost evaluator 44 and a report generator 45.

The failure mode analyzer maintains a database with entries relating to various failure modes. When the failure mode analyzer receives the information as input from the data centre 32, it compares the information with the entries in the database to determine the type of failure mode that has occurred. The database includes but not limited to the following:

General information of the turbine component under monitoring,

Current triggered alerts and historical alerts of turbine components,

Relevant alerts of the turbine components,

Sensor data used for detecting failures or triggering alert signals,

Signatures or patterns of data obtained from sensors relating to failures,

Means for determining false alarm probabilities and confidence levels, and

Actions taken to rectify failures.

Information relating to relevant alerts of the turbine components can be obtained from turbines which have experienced similar failures within the same wind farm, or from other turbines in other wind farms. Additionally or alternatively, the means for determining false alarm probabilities and confidence levels may include methods such as correlation relationship, cross referencing or any other statistical methods using data obtained from sensors or from other turbines.

After the failure mode of the component is determined by the failure mode analyzer 41, the lifetime calculator 42 determines a remaining lifetime of the component. The determining of the remaining lifetime of the component shall be illustrated with reference to FIG. 5.

Figure 5:
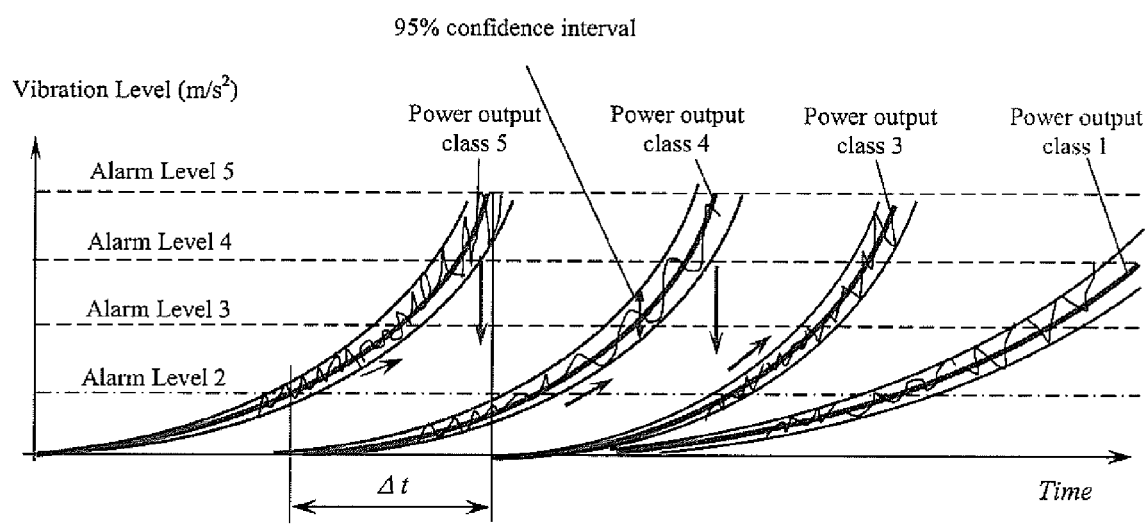
FIG. 5 illustrates the remaining lifetime of a component at various alarm levels and for various control strategies according to an embodiment.

FIG. 5 shows a graph illustrating the remaining lifetime of a component after a given alarm level is detected. The component may, e.g., be the gear box 10 of FIGS. 2a and 2b or the generator 2 of FIG. 2c. In the graph the vibration level of the component is plotted against time. Four vibration levels corresponding to four alarm levels, alarm level 2-5, are marked. Thus, when the vibration level for the component reaches the level marked 'alarm level 2', alarm level 2 is triggered for the component. Alarm level 5 is the most severe level, and when this level is reached, the component is very likely to break down, and operation of the wind turbine has to be stopped.

The curve labelled 'Power output class 5' illustrates the vibration level as a function of time in the case that the wind turbine is operated in power output class 5. The average vibration level as well as the 95% confidence interval band is plotted. When the vibration level corresponding to alarm level 2 is reached, the remaining lifetime is the time elapsing from the alarm level 2 is detected until the alarm level 5 is reached, and the component is most likely to break down. This time interval is marked as $\Delta t$.

In the graph, corresponding curves are plotted illustrating the situations where the wind turbine is operated in power output classes 4, 3 and 1, respectively. It can be seen from the graph, that the remaining lifetime is increased when the wind turbine is operated in a lower power class.

It should be noted that in the present context the term 'power output class' is interpreted to mean an output power interval for the wind turbine. For a specific wind turbine with a given nominal output power, the power levels are divided into suitable intervals, and the highest power class corresponds to nominal power or almost nominal power. As an example, for a 2.0 MW platform, the power classification may be as follows:

| | Power output class | | | | |
|---|---|---|---|---|---|
| | 1 | 2 | 3 | 4 | 5 |
| Power value $P_w$ (MW) | $P_w \leq 0.7$ | $0.7 < P_w \leq 1.2$ | $1.2 < P_w \leq 1.5$ | $1.5 < P_w \leq 1.8$ | $1.8 < P_w$ |

As another example, the power classification for a 3.0 MW platform may be as follows:

| | Power output class | | | | |
|---|---|---|---|---|---|
| | 1 | 2 | 3 | 4 | 5 |
| Power value $P_w$ (MW) | $P_w \leq 0.9$ | $0.9 < P_w \leq 1.5$ | $1.5 < P_w \leq 2.1$ | $2.1 < P_w \leq 2.65$ | $2.65 < P_w$ |

The curves shown in FIG. 5 may be obtained from measurements obtained from a large number of identical or similar components. Curves representing the vibration level versus the running time after a given alarm level is triggered may be plotted. One curve, e.g., means the turbine may run more than 80% of the remaining useful lifetime under power output class 5. Or, another curve, e.g., means the turbine may run over 80% of the remaining useful lifetime with power output class 4, etc. From all those reference curves, it turns out that the turbine may run with different control schemes by adjusting the time in which the component is operated at power output class after the given alarm level has been detected.

In another embodiment, the remaining lifetime of the component may be determined from empirically obtained data relating to lifetimes of identical or similar components. The measured remaining lifetime of a similar or identical component may be expressed using the expression:

$$\Gamma_{alarmlevel} = a_5\Gamma_5 + a_4\Gamma_4 + a_3\Gamma_3 + a_2\Gamma_2 + a_1\Gamma_1,$$

wherein $\Gamma_{alarmlevel}$ is the measured remaining lifetime of the similar or identical component after a given alarm level has been detected, $\Gamma_i$ is the time which the similar or identical component was operated at power output class i, and $a_i$ is a coefficient connected to the power output class i. For each alarm level the values of the $a_i$'s may be determined from measurements originating from a large number of components, e.g., by means of curve fitting and/or regression methods.

Once the $a_i$'s have been determined, the remaining lifetime of a component after a given alarm level has been detected, may be calculated using the following formula:

$$T_{alarmlevel} = a_5T_5 + a_4T_4 + a_3T_3 + a_2T_2 + a_1T_1,$$

where the $a_i$'s are the coefficients which have previously been determined as described above, $T_i$ is the time which the component is operated at power output class i, and $T_{alarmlevel}$ is the calculated remaining lifetime of the component after a given alarm level has been detected. It is noted that the remaining lifetime of the component may be adjusted by adjusting the $T_i$'s to obtain a desired remaining lifetime of the component.

After the remaining lifetime of the component is determined by the lifetime calculator 42, the control unit 43 determines one or more de-rating control recommendations for the component based on the remaining lifetime. An example of determining a de-rating control recommendation is illustrated with reference to FIG. 6.

Figure 6:
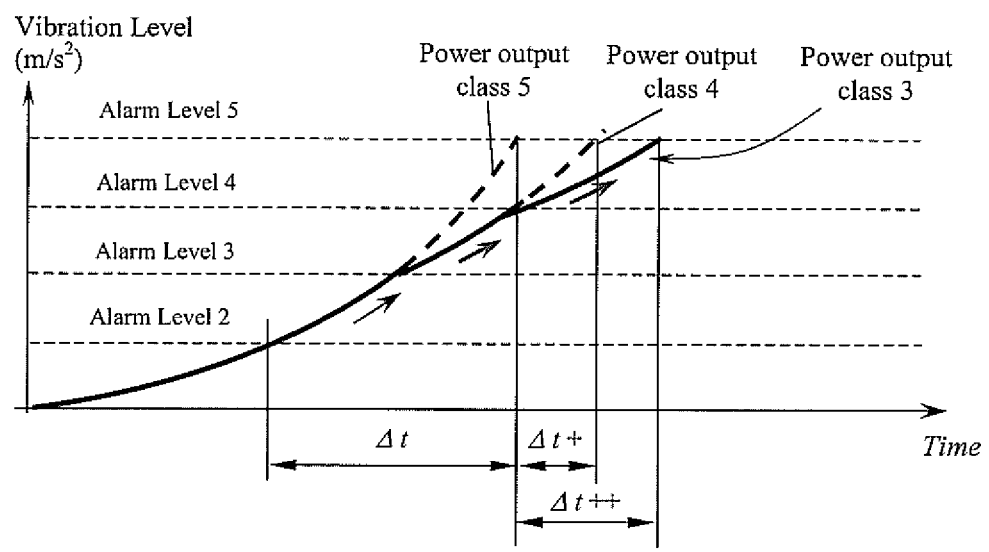
FIG. 6 illustrates the remaining lifetime of a component under an alternative control strategy according to an embodiment.

FIG. 6 shows a graph illustrating the remaining lifetime of the component under a control strategy according to an embodiment. According to this control strategy, when the vibration level corresponding to alarm level 2 is reached, the remaining useful lifetime is Δt if the wind turbine is operated in power output class 5 for more than 80% of the remaining lifetime. This is illustrated by the curve 'Power output class 5'.

If it turns out that Δt is shorter than the time until the next scheduled service event, then the wind turbine may be de-rated to be operated in power output class 4 for more than 80% of the remaining lifetime when the vibration level corresponding to alarm level 3 is reached. This is illustrated by the curve 'Power output class 4'. Thereby the remaining lifetime is extended by Δt+ as compared to the situation where the wind turbine is operated in power output class 5.

If it turns out that the extended remaining lifetime, (Δt)+ (Δt+), is also shorter than the time until the next scheduled service event, then the wind turbine may be even further de-rated to be operated in power class 3 for more than 80% of the remaining lifetime when the vibration level corresponding to alarm level 4 is reached. This is illustrated by the curve 'Power output class 3'. Therefore the remaining lifetime is extended even further by Δt++ as compared to the situation where the wind turbine is operated in power class 5. If this is still insufficient to obtain a desired remaining lifetime, then either further de-rating may be recommended, or it would be recommended to schedule an extra service event in order to repair or replace the component.

The desired remaining lifetime may be calculated in another manner in another example. As mentioned earlier, the desired remaining lifetime may be from the time when a certain alarm level is triggered to the time of low wind season or a next scheduled maintenance service of the turbine. After the alarm level is triggered, it needs to determine the remaining lifetime and the wind forecast in this period of time, i.e., the remaining lifetime. The wind forecast provides wind speed distribution data. Therefore, it is possible to determine the power output class the wind turbine will operate, and also the corresponding time period the wind turbine will operate under that power output class. The remaining lifetime can then be calculated using the following formula:

$$T_{alarmlevel}=a_5T_5+a_4T_4+a_3T_3+a_2T_2+a_1T_1.$$

If $T_{alarmlevel}$ is shorter than the desired remaining lifetime, the time period which the turbine will operate under power output class 5, 4 or others may need to be adjusted in order that the desired remaining lifetime can be reached.

The power tariff at each corresponding time period may also be taken into account in order to maximize the income of a customer. For example, if the desired remaining lifetime is two months and the first month's power tariff is higher than the second month, a suggested control operation would be:

Allow the turbine to operate under a highest power output class without applying any de-rating control, as long as the time period the turbine operates under the highest power output class is less than the predetermined time period for the desired remaining lifetime. The highest power output class is dependent on the available wind speed during this time period.

When the time period the turbine is operated under the highest power output class is reached, power output class 5 for instance, the turbine will not be allowed to operate under this power output class even if the wind speed supports that level.

Referring back to FIG. 4, after one or more de-rating recommendations were determined by the control unit 43, the cost evaluator 44 determines a power production yield for each of the de-rating recommendations from the control unit 43. The power production yield is determined based on one or more of the following factors: wind forecast, power tariff and cost of equipment. The power production yield provides information on the income (or loss of income) of power production based on the different de-rating control recommendations. For example, if the power tariff for the next one month, say July, is higher than the power tariff in August, it is desirable that the wind turbine is operated at a higher power output in July than in August. In other words, there is a higher loss of income when the wind turbine is de-rated in July than in August.

The cost of equipment of the component breaking down may also be taken into consideration. If the cost of equipment of the component is high, the replacement cost of that component will be high. The cost of equipment also includes operation and maintenance effort of the equipment, as well as the cost of the component that needed to be replaced. In an embodiment, the cost evaluator 44 may also take into account any compensation paid to the customer due to turbine being stopped or de-rated. Therefore, it is desirable that the wind turbine is operated in a manner that the lifetime of that component is extended into a period when it can be repaired at low wind speed. This has to be balanced against the above in relation to high wind speed where it is desirable that the turbine is not de-rated to prevent a high loss of income.

Figure 7:
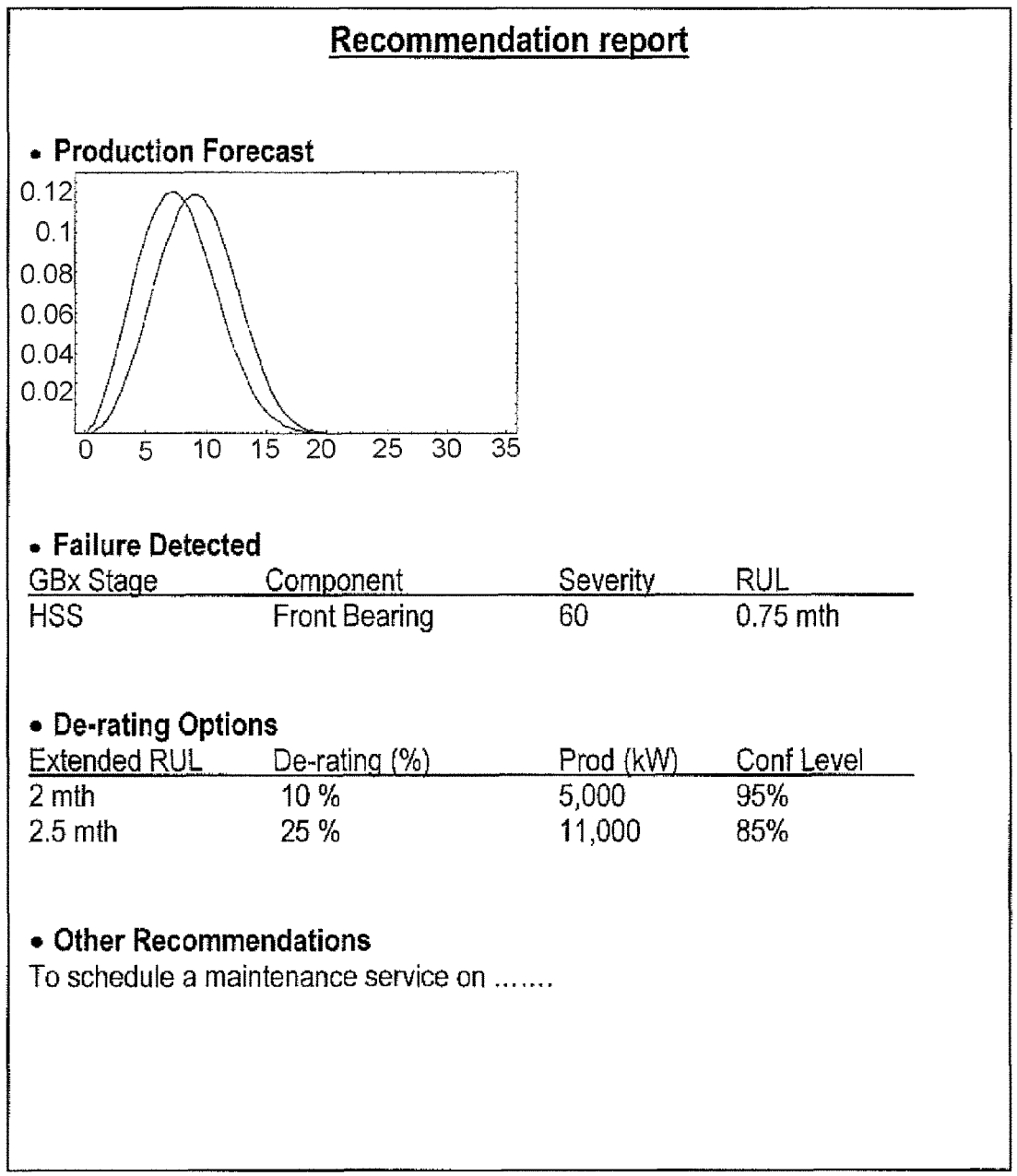
FIG. 7 illustrates a recommendation report generated by a report generator according to an embodiment.

The de-rating control recommendations and their corresponding power production yield may be presented in a report by the report generator 45. The report allows a user to have an overview of the de-rating recommendations and the possible loss of income due to the de-rating control. The user may then select a suitable de-rating control recommendation, based on various considerations, to control the operation of the wind turbine. FIG. 7 shows an example of a recommendation report generated by the report generator 45. The recommendation report of FIG. 7 includes the following:

Production Forecast: A comparison between the power output of the turbine with de-rating and without de-rating for a specific period of time.

Failure Detected: Details of specific components which are likely to breakdown. Examples of such details include gearbox stages (such as planetary stage, intermediate stage, high speed stage etc), components (front bearing, rear bearing, pinion gear etc), failure severity and estimated remaining lifetime before de-rating.

De-rating Options: One or more de-rating recommendations, the percentage of de-rating to the turbine, and extended remaining lifetime as a result of de-rating. A forecast of production for the respective de-rating recommendations may also be presented. A confidence level in achieving the extended remaining lifetime for the component is also included.

Other Recommendations: This may include special actions required to be perform, such as de-rating, replace components, schedule a maintenance service or some other follow up actions to rectify the failures.

The recommendation report shown in FIG. 7 is only an example of how the layout of a recommendation report generated by the report generator 45 could look like. It is possible that the recommendation report includes more or less sections mentioned above. The layout of the recommendation report may also be different in other examples.

It should be noted that a de-rating control recommendation may be selected automatically by the CBO unit 33, for example, based on predefined criteria such as the lowest cost. In an alternative embodiment, the CBO unit 33 does not include a report generator. Based on the output from the cost evaluator 44, a de-rating control recommendation corresponding to the highest power production yield (or lowest loss of income) is selected. As mentioned earlier, the operation of the wind turbine 31 is controlled based on the selected de-rating control recommendation.

Figure 8:
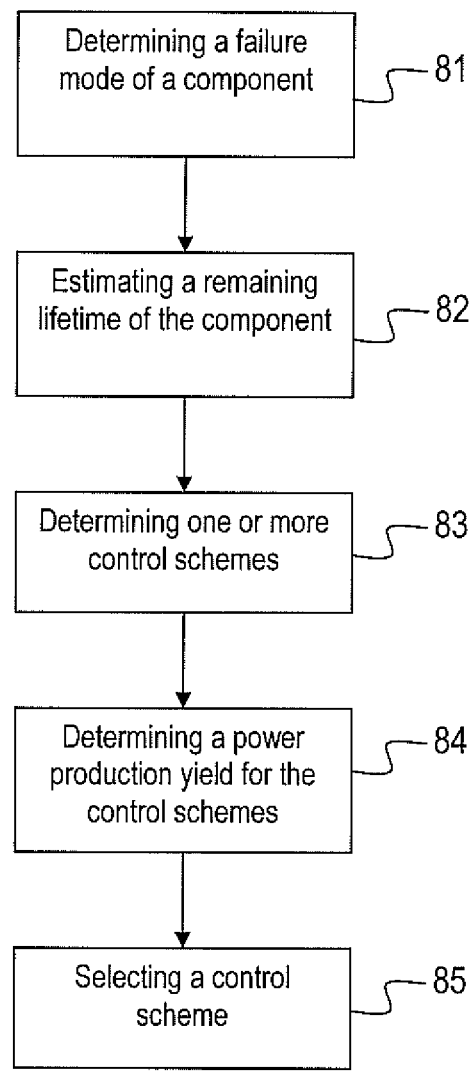
FIG. 8 is a flow chart illustrating a method for controlling the operation of the wind turbine according to an embodiment.

FIG. 8 is a flow chart illustrating a method for controlling the operation of the wind turbine according to an embodiment. Step 81 includes determining a failure mode of a component. As described earlier in an embodiment, data from sensors arranged at or near the component are obtained and analysed to determine if there is any abnormality. If there is, the data are analyzed to determine the type of failure mode that may occur in the component such as cracks in the gearbox. This step 81 may be determined by the failure mode analyzer 41 in the CBO unit 33.

Step 82 includes estimating a remaining lifetime of the component under current operating conditions. The remaining lifetime of the component can be determined based on empirically obtained data as described earlier, especially with reference to FIG. 5. This step 82 may be determined by the lifetime calculator 42 in the CBO unit 33. Step 83 includes determining one or more control schemes to control the operation of the wind turbine. For example, the control schemes may be reducing the power production of the wind turbine in order to extend the remaining lifetime of the component to a coming scheduled service event. This step 83 may be determined by the control unit 43 in the CBO unit 33.

Step 84 includes determining a power production yield for the control schemes determined in step 83. As described earlier in an embodiment, the power production yield may be determined based on at least power tariff, cost of equipment and/or wind data forecast. This step 84 may be determined by the cost evaluator 44 in the CBO unit 33. Step 85 includes selecting a control scheme for controlling the operation of the wind turbine. The control scheme is selected based on the power production yield determined in step 84. As described earlier, the control scheme may be selected automatically by the CBO unit 33, or manually by a user based on additional considerations. If the control scheme is selected by a user, a report may be generated, for example by the report generator 45 in the CBO unit 33, to provide the user with an overview of the control schemes and their corresponding power production yield.

When a control scheme is selected, the operation of the wind turbine is controlled based on the selected control scheme. For example, the power production of the wind turbine may be reduced (de-rated) to 80% of its current power output until the next scheduled service event.

It should be emphasized that the above-described embodiments are possible examples of implementations which are merely set forth for a clear understanding of the principles of the invention. The person skilled in the art may make many variations and modifications to the above-described embodiment(s) of the invention, said variations and modifications are intended to be included herein within the scope of the following claims.

The invention claimed is:

1. A method for controlling the operation of a wind turbine, the method comprising:
    determining, with a failure mode analyzer of a Condition Based Operation (CBO) unit, at least one failure mode relating to at least one component of the wind turbine;
    estimating, with a lifetime calculator of the CBO unit, a remaining lifetime of the component under current operating conditions;
    determining, with a control unit of the CBO unit and based at least in part on the estimated remaining lifetime of the component under current operating conditions, a plurality of control schemes to control the operation of the wind turbine in order to adjust the remaining lifetime of the component to a desired remaining lifetime that allows the component to function until a selected future date;
    determining, with a cost evaluator of the CBO unit, a power production yield for each of the determined control schemes; and
    selecting one of the determined control schemes for controlling the operation of the wind turbine that maximizes the power production yield.

2. The method according to claim 1, wherein determining at least one failure mode comprises:
    obtaining data relating to health status of the component of the wind turbine;
    analyzing the obtained data to determine whether there is any abnormality;
    triggering an alert signal when it is determined that there is abnormality in the obtained data; and
    determining the at least one failure mode based on the analyzed data.

3. The method according to claim 2, wherein analyzing the obtained data to determine whether there is any abnormality comprises:
    determining whether there is any substantial deviation of the obtained data from a predetermined set of data.

4. The method according to claim 2, wherein obtaining data relating to health status of the component comprises:
    measuring one or more parameters of the component by means of one or more sensors.

5. The method according to claim 1, wherein estimating a remaining lifetime of the component is performed based on empirically obtained data.

6. The method according to claim 5, wherein the empirically obtained data comprises data relating to wind speed and/or wind direction at the site of the wind turbine.

7. The method according to claim 5, wherein the empirically obtained data comprises data relating to lifetimes of components identical or similar to the component.

8. The method according to claim 1, wherein the plurality of control schemes to control the wind turbine comprises:
    reducing the power production of the wind turbine in order to extend the remaining lifetime of the component to a selected future date, wherein the selected future date comprises a coming scheduled maintenance of the wind turbine.

9. The method according to claim 1, wherein the power production yield for each of the plurality of control schemes is determined based on at least one factor selected from a group consisting of power tariff, cost of equipment and wind data forecast.

10. The method according to claim 1, further comprising:
    generating a recommendation report comprising the plurality of control schemes and the respective power production yield, wherein a determined control scheme is selected based on the recommendation report.

11. The method according to claim 1, further comprising: controlling the wind turbine based on the selected control scheme.

12. A system for controlling operation of a wind turbine, the system comprising:
- a failure mode analyzer adapted to determine a failure mode for at least one component of the wind turbine;
- a lifetime calculator adapted to determine a remaining lifetime of the component under current operating conditions;
- a control unit adapted to determine a plurality of control schemes to control the operation of the wind turbine in order to adjust the remaining lifetime of the component to a desired remaining lifetime based at least in part on the estimated remaining lifetime of the component under current operating conditions that allows the component to function until a selected future date; and
- a cost evaluator adapted to determine a power production yield for each of the control schemes.

13. The system according to claim 12, wherein the failure mode analyzer determines the failure mode based on data relating to health status of the component of the wind turbine.

14. The system according to claim 12, wherein the lifetime calculator determines the remaining lifetime of the component based on empirically obtained data.

15. The system according to claim 12, wherein the plurality of control schemes comprises a recommendation to reduce the power production of the wind turbine in order to extend the remaining lifetime of the component to a selected future date, wherein the selected future date comprises a coming scheduled maintenance of the wind turbine.

16. The system according to claim 12, wherein the cost evaluator determines the power production yield for the plurality of control schemes based on at least one factor selected from a group consisting of power tariff, cost of equipment and wind data forecast.

17. The system according to claim 12, further comprising:
- a report generator adapted to generate a recommendation report comprising the plurality of control schemes and the respective power production yield, so as to allow a control scheme for controlling the operation of the wind turbine to be selected.

18. A wind power plant comprising:
- at least one wind turbine; and
- a monitoring unit, the monitoring unit comprising:
- a failure mode analyzer adapted to determine a failure mode for at least one component of the wind turbine;
- a lifetime calculator adapted to determine a remaining lifetime of the component under current operating conditions;
- a control unit adapted to determine a plurality of control schemes to control the operation of the wind turbine in order to adjust the remaining lifetime of the component to a desired remaining lifetime based at least in part on the estimated remaining lifetime of the component under current operating conditions that allows the component to function until a selected future date; and
- a cost evaluator adapted to determine a power production yield for each of the control schemes.

19. The wind power plant according to claim 18, wherein the wind turbine comprises one or more sensors for obtaining data relating to health status of the component of the wind turbine, wherein the one or more sensors are arranged at or in the vicinity of the component.

20. The wind power plant according to claim 18, wherein the monitoring unit further comprises a report generator adapted to generate a recommendation report comprising the plurality of control schemes and the respective power production yield, so as to allow a control scheme for controlling the operation of the wind turbine to be selected.

* * * * *